(12) United States Patent
Sato et al.

(10) Patent No.: US 10,030,565 B2
(45) Date of Patent: Jul. 24, 2018

(54) EXHAUST PURIFICATION DEVICE

(71) Applicant: HINO MOTORS, LTD., Hino-shi, Tokyo (JP)

(72) Inventors: Satoshi Sato, Hino (JP); Hiroshi Inoue, Sagamihara (JP)

(73) Assignee: HINO MOTORS, LTD., Hino-Shi, Tokyo (JP)

( * ) Notice: Subject to any disclaimer, the term of this patent is extended or adjusted under 35 U.S.C. 154(b) by 0 days.

(21) Appl. No.: 15/611,375

(22) Filed: Jun. 1, 2017

(65) Prior Publication Data

US 2017/0350298 A1    Dec. 7, 2017

(30) Foreign Application Priority Data

Jun. 7, 2016    (JP) ................................ 2016-113612

(51) Int. Cl.
*F01N 3/28* (2006.01)
*B01D 53/94* (2006.01)
*F01N 3/20* (2006.01)

(52) U.S. Cl.
CPC ....... *F01N 3/2892* (2013.01); *B01D 53/9418* (2013.01); *F01N 3/2066* (2013.01); *B01D 2255/104* (2013.01); *B01D 2255/1021* (2013.01); *B01D 2255/20761* (2013.01); *B01D 2255/707* (2013.01)

(58) Field of Classification Search
None
See application file for complete search history.

(56) References Cited

U.S. PATENT DOCUMENTS

2008/0307780 A1* 12/2008 Iverson .................. F01N 3/025
60/311

FOREIGN PATENT DOCUMENTS

JP          2000008833 A        1/2000

* cited by examiner

*Primary Examiner* — Walter D. Griffin
*Assistant Examiner* — Jelitza M Perez
(74) *Attorney, Agent, or Firm* — Kilpatrick Townsend & Stockton

(57) ABSTRACT

An exhaust purification device includes an adding valve that adds an additive to exhaust gas. A first partition plate includes a first hole-formation region, which includes a main flow hole extending through a central portion and sub-flow holes surrounding the main flow hole, and a first hole-free region surrounding the first hole-formation region. A second partition plate located at a downstream side of the first partition plate includes a second hole-free region, which includes a portion overlapping the main flow hole, and a second hole-formation region surrounding the second hole-free region. An injector injects the additive in a circumferential direction of the first hole-free region from a position opposing the first hole-free region in the extending direction and opposing a projection of the first hole-formation region in a cross-sectional direction.

10 Claims, 4 Drawing Sheets

EXHAUST PURIFICATION DEVICE

BACKGROUND OF THE INVENTION

The present invention relates to an exhaust purification device that purifies exhaust gas with an additive added to the exhaust gas.

Japanese Laid-Open Patent Publication No. 2000-8833 describes a known example of a urea selective catalytic reduction (SCR) device serving as an exhaust purification device that purifies exhaust gas by lowering nitrogen oxide (hereinafter referred to as "NOx") from the exhaust gas. The urea SCR device uses an adding valve that adds urea water to exhaust gas and a selective reduction catalyst located at a downstream side of the adding valve. In the urea SCR device, the urea water added to exhaust gas is hydrolyzed to ammonia by the heat of the exhaust gas. When the exhaust gas containing the ammonia flows into the selective reduction catalyst, NOx in the exhaust gas is reduced to nitrogen and water by the ammonia serving as an additive.

In order to efficiently lower NOx in a selective reduction catalyst, it is preferred that an additive be sufficiently dispersed when flowing into the selective reduction catalyst. The dispersibility, which indicates the dispersion degree of the additive in exhaust gas, has a tendency to increase as the distance from the location where urea water is added to the selective reduction catalyst becomes longer. However, this enlarges the exhaust purification device. Such a problem is not limited to an exhaust purification device using urea water as an additive and also occurs in an exhaust purification device that purifies exhaust gas with an additive added to the exhaust gas.

SUMMARY OF THE INVENTION

It is an object of the present invention to provide an exhaust purification device that improves the dispersability of an additive and limits enlargement of the exhaust purification device.

An exhaust purification device according to one aspect of the present invention includes an adding valve, a first partition plate, and a second partition plate. The adding valve adds an additive to exhaust gas flowing through an exhaust passage. The first partition plate includes a flow hole through which the exhaust gas flows. The first partition plate partitions the exhaust passage. The second partition plate includes a flow hole through which the exhaust gas flows. The second partition plate partitions the exhaust passage at a downstream side of the first partition plate and at an upstream side of a selective reduction catalyst. The first partition plate includes a projection, a first hole-formation region, and a first hole-free region. The projection projects toward an upstream side of the exhaust passage so that a central portion of the first partition plate is located at an upstream side of other portions of the first partition plate in the exhaust passage. The first hole-formation region includes a main flow hole extending through the central portion and sub-flow holes surrounding the main flow hole. The sub-flow holes each have a smaller open area than the main flow hole, and the first hole-formation region includes at least a portion of the projection. The first hole-free region surrounds the first hole-formation region. The first hole-free region is free from flow holes. The second partition plate includes a second hole-free region and a second hole-formation region. The second hole-free region includes a portion overlapping the main flow hole in an extending direction of the exhaust passage. The second hole-free region is free from flow holes. The second hole-formation region surrounds the second hole-free region. The second hole-formation region includes flow holes. The adding valve includes an injector that injects the additive in a circumferential direction of the first hole-free region from a position opposing the first hole-free region in the extending direction and opposing the projection in a cross-sectional direction that is orthogonal to the extending direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of an exhaust purification device will now be described with reference to FIGS. 1 to 5.

Figure 1:
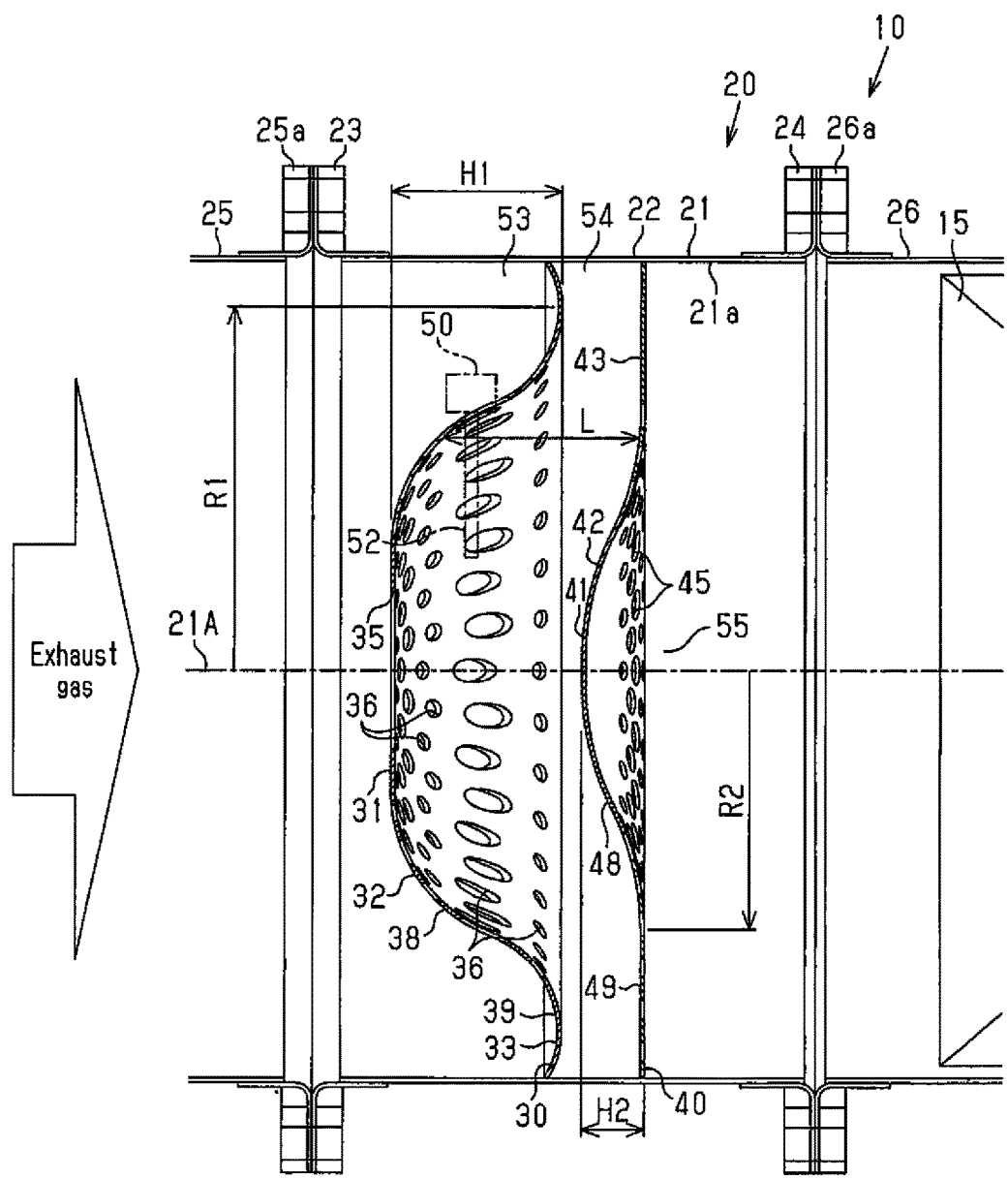
FIG. 1 is a schematic view showing one embodiment of an exhaust purification device.

As shown in FIG. 1, an exhaust purification device 10 that purifies exhaust gas of an engine includes an adding device 20. The adding device 20 adds an additive to exhaust gas that flows into a selective reduction catalyst 15. In the selective reduction catalyst 15, catalytic metal such as platinum, silver, or copper corresponding to the type of an additive is supported by, for example, a flow-through monolithic support formed from ceramic or stainless steel having excellent heat resistance. In the selective reduction catalyst 15, NOx contained in exhaust gas is reduced to nitrogen, water, and the like through a reduction reaction between the NOx and an additive added by the adding device 20.

The adding device 20 includes a passage 21, a first partition plate 30, a second partition plate 40, and an adding valve 50.

The passage 21 is formed by, for example, a metal tube such as stainless steel and functions as a portion of an exhaust passage through which exhaust gas of an engine flows. The passage 21 includes a tubular passage body 22 extending straight in an extending direction, an upstream flange 23 coupled to one end of the passage body 22, and a downstream flange 24 coupled to the other end of the passage body 22. In the passage 21, the upstream flange 23 is fastened to a flange 25a of an upstream passage 25, and the downstream flange 24 is fastened to a flange 26a of a downstream passage 26.

It is preferred that the first and second partition plates 30 and 40 be formed from, for example, metal such as stainless steel and the same material as the passage 21. Each of the first and second partition plates 30 and 40 includes an outer circumferential edge coupled to an inner circumferential surface 21a of the passage 21. The second partition plate 40 is located at a downstream side of the first partition plate 30 in the passage 21 and opposes the first partition plate 30 at a position separated from the first partition plate 30.

The first partition plate 30 includes a first projection 32 projecting toward an upstream side of the passage 21 and a first annular flange 33 that is continuous with the first projection 32. The first partition plate 30 is configured to partition the passage 21 into the upstream side and the downstream side. More specifically, the first projection 32 projects toward the upstream side of the passage 21 so that a first central portion 31 of the first partition plate 30 is located at an upstream side of other portions of the first partition plate 30 in the passage 21. The first annular flange 33 includes an inner circumferential edge that is continuous with an outer circumferential edge of the first projection 32. The first annular flange 33 is shaped to extend further toward the upstream side of the passage 21 as the inner circumferential surface 21a of the passage 21 becomes closer. The outer circumferential edge of the first projection 32 is located at a position separated by the distance R1 from the center axis 21A in a cross-sectional direction that is orthogonal to the center axis 21A corresponding to the extending direction of the passage 21. Further, the first projection 32 projects from the outer circumferential edge toward the upstream side of the passage 21 by a projection amount H1.

The second partition plate 40 includes a second projection 42 projecting toward an upstream side of the passage 21 and a second annular flange 43 that is continuous with the second projection 42. The second partition plate 40 is configured to partition the passage 21 into the upstream side and the downstream side. More specifically, the second projection 42 projects toward the upstream side of the passage 21 so that a second central portion 41 of the second partition plate 40 is located at the upstream side of other portions of the second partition plate 40 in the passage 21. The second annular flange 43 is flat and extends in the cross-sectional direction of the passage 21 from an inner circumferential edge of the second annular flange 43 that is continuous with an outer circumferential edge of the second projection 42. The second projection 42 projects more gradually than the first projection 32 of the first partition plate 30. The outer circumferential edge of the second projection 42 is located at a position separated by the distance R2 (<R1) from the center axis 21A in the cross-sectional direction. Further, the second projection 42 projects from the outer circumferential edge toward the upstream side of the passage 21 by a projection amount H2 (<H1).

In other words, the outer circumferential edge of the second projection 42 of the second partition plate 40 is located at a position closer to the center axis 21A than the outer circumferential edge of the first projection 32 of the first partition plate 30 in the cross-sectional direction of the passage 21, and the second projection 42 of the second partition plate 40 is located inward from the first projection 32 of the first partition plate 30 as viewed in the extending direction of the passage 21. Further, the distance L between the first partition plate 30 and the second partition plate 40 in the extending direction of the passage 21 decreases at the outer circumferential portion of the first projection 32 of the first partition plate 30 as the distance from the center axis 21A increases.

Figure 2:
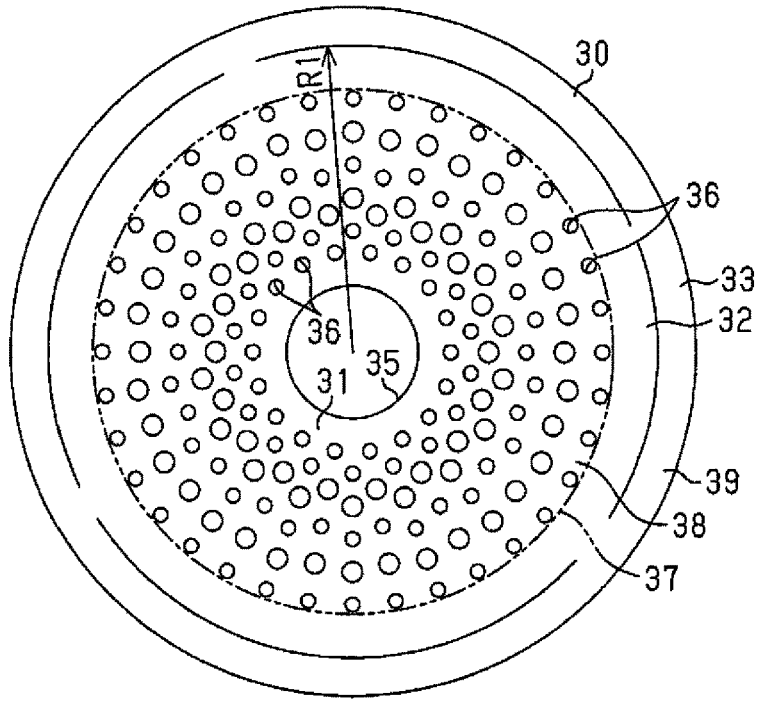
FIG. 2 is a front view showing the structure of a first partition plate of the exhaust purification device shown in FIG. 1.

As shown in FIG. 2, the first central portion 31 of the first partition plate 30 includes a main flow hole 35, which is a large hole through which some of the exhaust gas flows. Further, the first partition plate 30 includes sub-flow holes 36 that are concentrically arranged in the circumferential direction to surround the main flow hole 35. Each sub-flow hole 36 extends through the first projection 32 and has a smaller open area than the main flow hole 35.

The first partition plate 30 includes a first hole-formation region 38 and a first hole-free region 39. The first hole-formation region 38 includes the main flow hole 35 and the sub-flow holes 36 and is located inward from double-dashed line 37. The first hole-free region 39 is located outward from the double-dashed line 37 and is free from flow holes for exhaust gas. The first hole-formation region 38 is formed by a portion of the first projection 32, and the first hole-free region 39 is formed by the remaining portion of the first projection 32 and the first annular flange 33.

Figure 3:
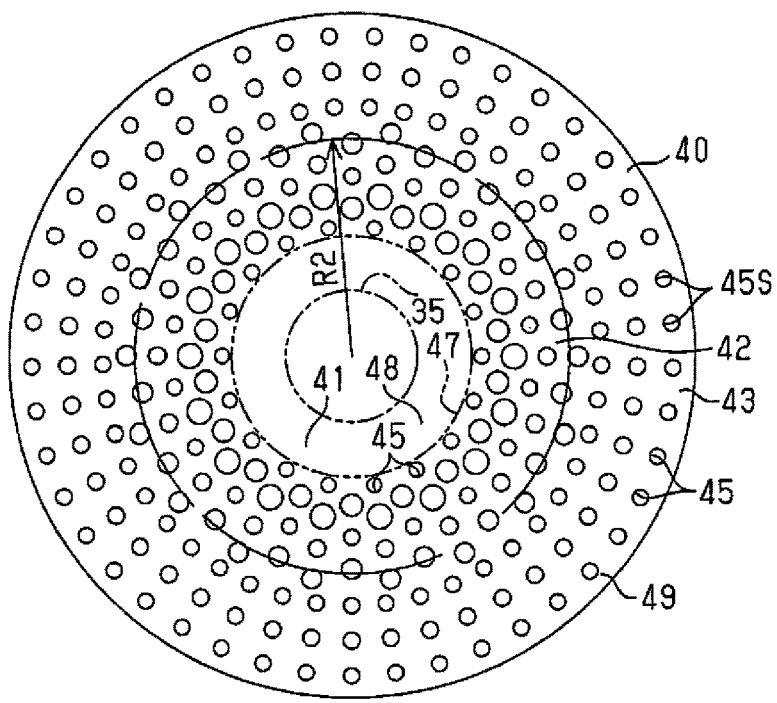
FIG. 3 is a front view showing the structure of a second partition plate of the exhaust purification device shown in FIG. 1.

As shown in FIG. 3, the second partition plate 40 includes flow holes 45 that are concentrically arranged to surround the second central portion 41. The second partition plate 40 includes a second hole-free region 48 and a second hole-formation region 49. The second hole-free region 48 is free from the flow holes 45 for exhaust gas and is located inward from double-dashed line 47. The second hole-formation region 49 is located outward from the second hole-free region 48 and includes the flow holes 45.

The second hole-free region 48 is formed by a portion of the second projection 42 and closes a portion overlapping the main flow hole 35 of the first partition plate 30 in the extending direction of the passage 21. That is, the inner region is a hole-formation region and the outer region is a hole-free region in the first partition plate 30, and the inner region is a hole-free region and the outer region is a hole-formation region in the second partition plate 40.

The second hole-formation region 49 is formed by the remaining portion of the second projection 42 and the second annular flange 43. Flow holes 45S are the ones of the flow holes 45 located at the outermost circumferential side and arranged at positions opposing the first hole-free region 39 of the first partition plate 30. Further, a region of the second hole-formation region 49 located proximate to the second hole-free region 48 has a higher open ratio than other regions of the second hole-formation region 49. The open ratio is a value that represents the proportion of a unit region occupied by hole open portions.

Figure 4A:
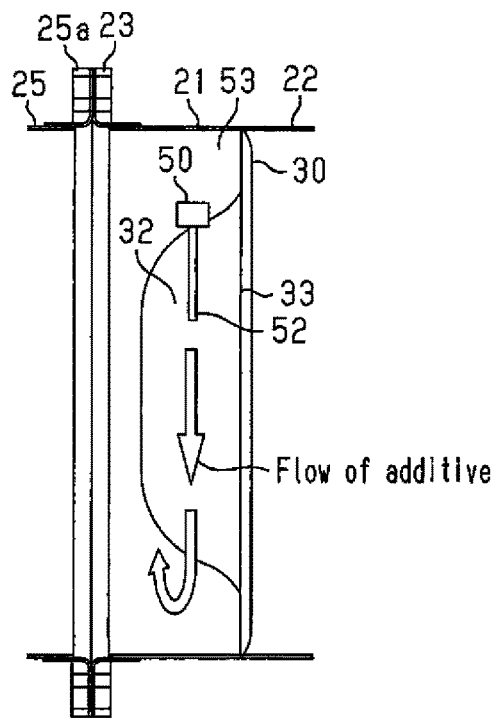
FIG. 4A is a schematic side view showing the positional relationship of the first partition plate and an adding valve of the exhaust purification device shown in FIG. 1 without flow holes.
Figure 4B:
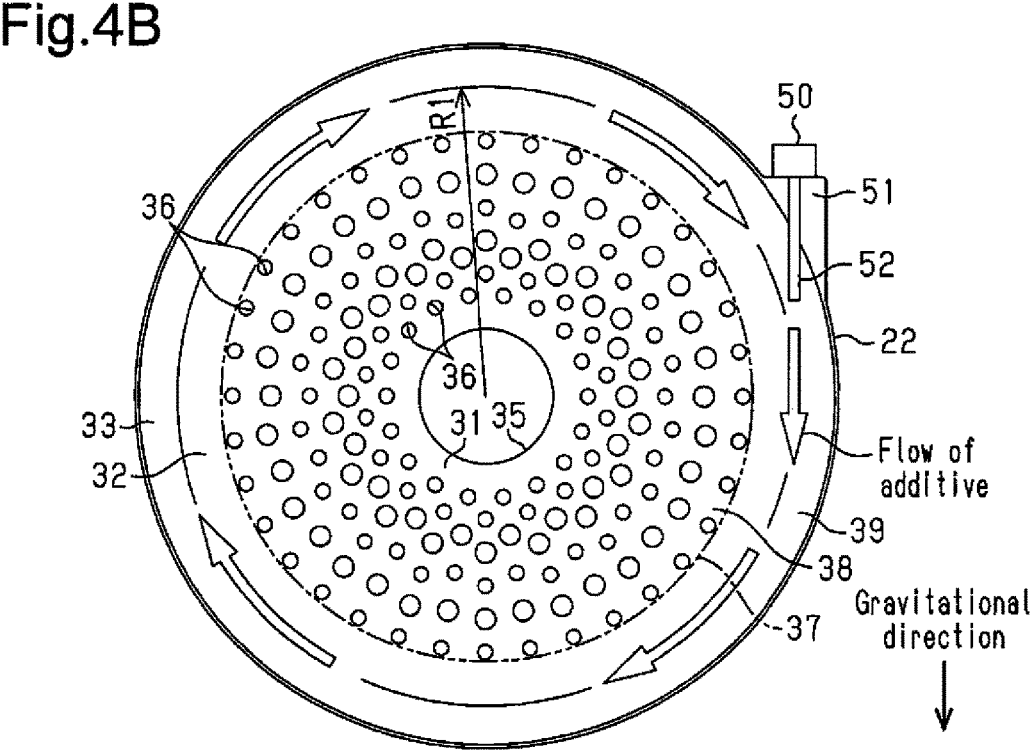
FIG. 4B is a schematic front view showing the structure of the first partition plate and the flow of an additive in the exhaust purification device shown in FIG. 1.

As shown in FIGS. 4A and 4B, the adding valve 50 is coupled to a coupling portion 51 that is formed on the passage body 22 of the passage 21. The adding valve 50 includes an injector 52 that injects an additive. The injector 52 injects an additive from an open space 53 between the first projection 32 of the first partition plate 30 and the passage 21 in the cross-sectional direction of the passage 21, that is, from the upstream position of the passage 21 opposing the first hole-free region 39 of the first partition plate 30. The injector 52 injects an additive in the circumferential direction of the first hole-free region 39, preferably, in a gravitational direction. In other words, the injector 52 of the adding valve 50 injects an additive in the circumferential direction, in which the first hole-free region 39 extends, from the position opposing the first hole-free region 39 in the extending direction of the passage 21 and opposing the first projection 32 in the cross-sectional direction of the passage 21. The additive injected from the injector 52 of the adding valve 50 flows around the first projection 32 of the first partition plate 30. The additive only needs to reduce NOx in the selective reduction catalyst 15 and is, for example, urea water, ammonia, or engine fuel that in accordance with catalyst metal of the selective reduction catalyst 15.

The operation of the exhaust purification device will now be described with reference to FIG. 5.

Figure 5:
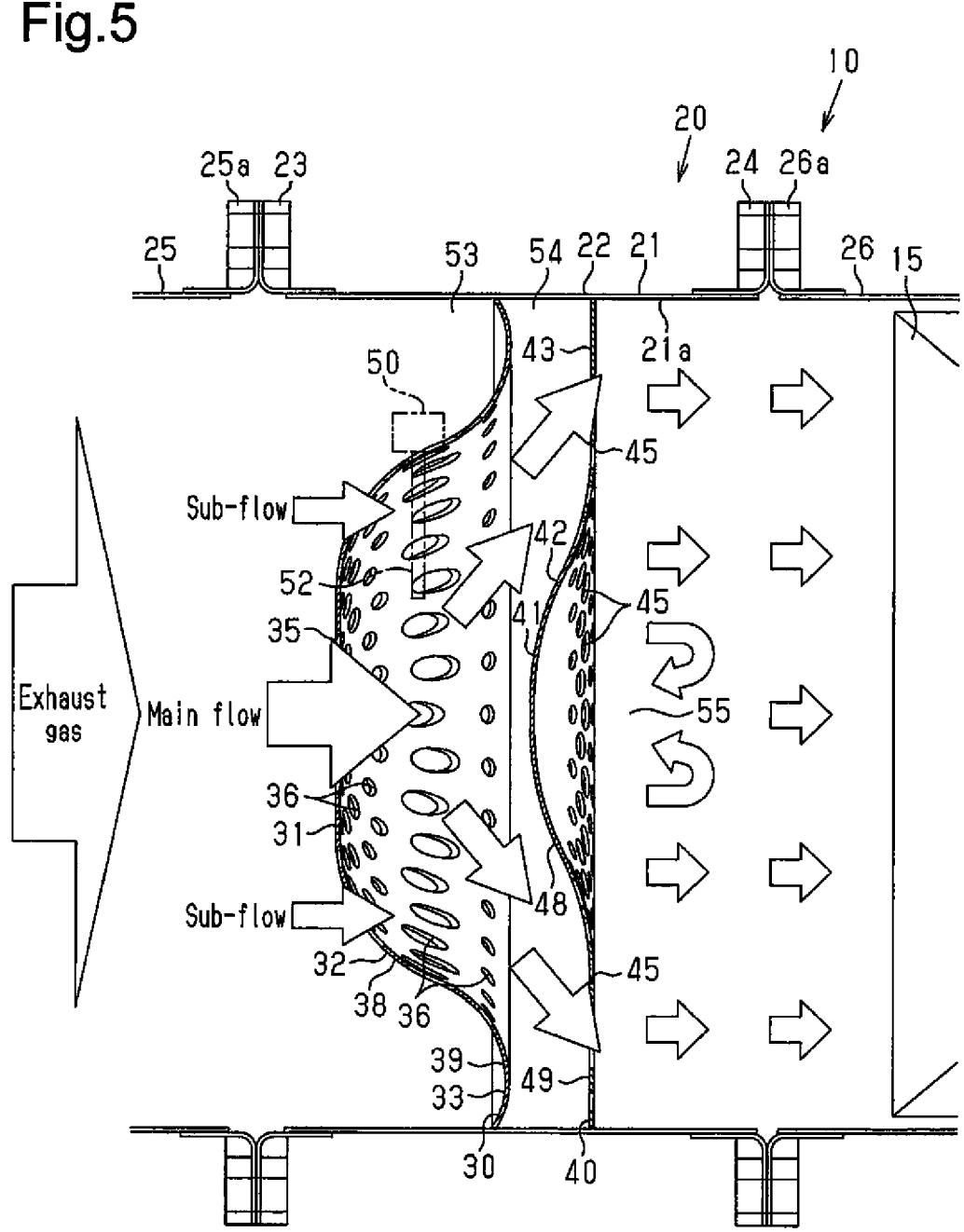
FIG. 5 is a schematic view showing the flow of exhaust gas into a selective reduction catalyst in the exhaust purification device shown in FIG. 1.

As shown in FIG. 5, the exhaust gas that has flowed into the exhaust purification device is divided into a main flow that flows into the main flow hole 35 of the first partition plate 30 and a sub-flow that flows into the sub-flow holes 36 through the open space 53 between the first projection 32 of the first partition plate 30 and the passage 21 in the cross-sectional direction of the passage 21. The additive injected from the injector 52 of the adding valve 50 is added to the sub-flow, which is exhaust gas passing through the sub-flow holes 36, not the main flow, which is exhaust gas passing through the main flow hole 35. The additive flows around the first projection 32 of the first partition plate 30 and is thus added to the sub-flow in a wide range in the circumferential direction.

The main flow that has passed through the main flow hole 35 flows toward the second hole-free region 48 of the second partition plate 40. However, since the second hole-free region 48 is free from flow holes, the main flow diffuses in an open space between the first partition plate 30 and the second partition plate 40 toward the outer circumferential side of the second partition plate 40. The main flow and the sub-flow are mixed in a mixing space 54 that is located at an upstream side of the second hole-formation region 49. The mixed exhaust gas flows into the flow holes 45 of the second hole-formation region 49. Thus, the main flow hits, from beside, the sub-flow that has passed through the sub-flow holes 36. This increases the efficiency for mixing the main flow and the sub-flow.

The exhaust gas that has passed through the flow holes 45 located proximate to the second hole-free region 48 (near second hole-free region 48) of the second partition plate 40 is swirled as it flows toward an open space 55 that is located at a downstream side of the second hole-free region 48 of the second partition plate 40. Then, after the exhaust gas is further mixed, the exhaust gas flows toward the selective reduction catalyst 15, which is located at the downstream side of the passage 21. Further, the exhaust gas that has passed through the other flow holes 45 of the second partition plate 40 flows toward the selective reduction catalyst 15, which is located at the downstream side of the passage 21. That is, at the downstream side of the second partition plate 40, the flow of the exhaust gas caused by the swirl is generated in the region located at a downstream side of the second hole-free region 48, and the flow of the exhaust gas that has passed through the flow holes 45 of the second partition plate 40 is generated in the region located at a downstream side of the second hole-formation region 49. This allows the exhaust gas including an additive to flow throughout the passage 21 in the cross-sectional direction and thus improves the dispersability of the additive. Such an improvement in the dispersability is realized by the first partition plate, the second partition plate, and the adding valve. This limits enlargement of the exhaust purification device.

The exhaust purification device of the above embodiment includes the advantages described below.

(1) The arrangement of the first partition plate 30, the second partition plate 40, and the adding valve 50 limits the enlargement of the exhaust purification device and improves the dispersability of an additive in exhaust gas that flows into the selective reduction catalyst 15. This increases the performance of lowering NOx in the selective reduction catalyst 15.

(2) The first partition plate 30 includes the first annular flange 33, which forms a portion of the first hole-free region 39. The first annular flange 33 is shaped to extend further toward the upstream side of the passage 21 as the inner circumferential surface 21a of the passage 21 becomes closer. Such a structure limits stagnation of the exhaust gas at the upstream side of the first hole-free region 39 as compared to when the first partition plate 30 only includes the first projection 32. This limits situations in which some of the additive remains in the stagnating exhaust gas and improves the accuracy related to a content amount of the additive in the exhaust gas.

(3) In the first partition plate 30, only the first projection 32 includes the sub-flow holes 36. In such a structure, when the shape of the first partition plate 30 and the position where the adding valve 50 adds an additive are the same, the sub-flow holes 36 are separated from the injector 52 of the adding valve 50 in the cross-sectional direction as compared to when the first annular flange 33 also includes the sub-flow holes 36. This reduces the amount of the additive added to the exhaust gas immediately after the additive is injected. Thus, the additive that starts to flow from the injected position easily reaches distant positions in the circumferential direction. As a result, the additive in the sub-flow has a uniform concentration distribution.

(4) The second partition plate 40 includes the second projection 42 projecting toward the first partition plate 30 so that the second central portion 41 of the second partition plate 40 is located at the upstream side of other portions of the second partition plate 40 in the passage 21. Such a structure smoothly guides the main flow that has passed through the main flow hole 35 from the second hole-free region 48 toward the second hole-formation region 49. This limits energy loss that occurs when exhaust gas hits the second hole-free region 48. Thus, the pressure loss of exhaust gas that passes through the first and second partition plates 30 and 40 is limited. In addition, the pressure of the open space 55 located at the downstream side of the second hole-free region 48 easily decreases. Thus, the exhaust gas that has passed through the flow holes 45 of the second partition plate 40 easily flows into the open space 55. This further improves the dispersability of an additive.

(5) The second projection 42 of the second partition plate 40 is located inward from the first projection 32 of the first partition plate 30 as viewed in the extending direction of the passage 21. In such a structure, the mixing space 54 is larger than when the first projection 32 of the first partition plate 30 is located inward from the second projection 42 of the second partition plate 40. This improves the mixability of the main flow and the sub-flow in the mixing space 54.

(6) The projection amount H2 of the second partition plate 40 is smaller than the projection amount H1 of the first partition plate 30. In such a structure, the mixing space 54 is larger than when the projection amounts H1 and H2 are the same. This improves the mixability of the main flow and the sub-flow in the mixing space 54.

In the present embodiment, the second projection 42 of the second partition plate 40 is located inward from the first projection 32 of the first partition plate 30 as viewed in the extending direction of the passage 21, and the projection amount H2 is smaller than the projection amount H1. Thus, in the present embodiment, the advantages (5) and (6), that is, the advantages in which the mixability of the main flow and the sub-flow in the mixing space 54 is improved, become more outstanding.

(7) The second projection 42 of the second partition plate 40 is located inward from the first projection 32 of the first partition plate 30 as viewed in the extending direction of the passage 21, and the projection amount H2 is smaller than the projection amount H1. The second projection 42 of the second partition plate 40 includes the flow holes 45. Thus, the distance L between the first partition plate 30 and the second partition plate 40 decreases at the outer circumferential portion of the first projection 32 of the first partition plate 30 as the distance from the center axis 21A increases. That is, a cross-sectional area of the flow of exhaust gas, which flows in the mixing space 54 toward the outer circumferential side, decreases as the distance from the center axis 21A increases. In such a structure, while some of the exhaust gas flows into the flow holes 45 of the second projection 42 and the remaining exhaust gas flows in the mixing space 54 toward the outer circumferential side, decreases in the flow speed of the remaining exhaust gas are limited. This ensures that exhaust gas is supplied to the flow holes 45S, which are the ones of the flow holes 45 located at the outermost circumferential side. This limits situations in which the flow rate distribution of exhaust gas flowing into the selective reduction catalyst 15 locally decreases at the outer circumferential portion.

(8) The region of the second hole-formation region 49 located proximate to the second hole-free region 48 has a higher open ratio of flow holes than the other regions of the second hole-formation region 49. Such a structure increases the amount of exhaust gas that flows into the flow holes 45 located around the second hole-free region 48. Thus, even if some of the exhaust gas flows into the open space 55 located at the downstream side of the second hole-free region 48, the situations are limited in which the flow rate distribution of exhaust gas flowing into the selective reduction catalyst 15 locally decreases at the inner circumferential portion.

(9) The injector 52 of the adding valve 50 injects an additive in the gravitational direction. Such a structure limits situations in which force of an additive decreases immediately after the additive is injected from the adding valve 50. This decreases the amount of the additive added to the sub-flow immediately after the injection. Thus, the additive that starts to flow from the injected position easily reaches distant positions in the circumferential direction. As a result, the additive in the sub-flow has a uniform concentration distribution. That is, gravity can be efficiently used when the additive is injected in the circumferential direction of the first hole-free region 39.

It should be apparent to those skilled in the art that the present invention may be embodied in many other specific forms without departing from the spirit or scope of the invention. Particularly, it should be understood that the present invention may be embodied in the following forms.

The direction in which the adding valve 50 injects an additive only needs to be the circumferential direction of the first hole-free region 39. The injecting direction is not limited to the gravitational direction and may be the horizontal direction.

The exhaust purification device 10 may include one or more adding valves 50. For example, the exhaust purification device 10 may include two adding valves 50 at positions opposing each other. When the exhaust purification device 10 includes a plurality of adding valves 50, it is preferred that the injecting direction of each adding valve 50 be the same in the circumferential direction. In such a structure, the additive in exhaust gas that has passed through the sub-flow holes 36 of the first partition plate 30 has a uniform concentration distribution. This further improves the dispersability of the additive at the downstream side of the second partition plate 40.

The open ratio of the flow holes 45 in the second hole-formation region 49 may gradually decrease toward the region located at the outer circumferential edge. Further, the open ratio of the flow holes 45 in the region located proximate to the second hole-free region 48 does not have to be high. For example, the open ratio of the flow holes 45 may be uniform in every region or low in the region located proximate to the second hole-free region 48.

The projection amount of the second projection 42 of the second partition plate 40 may be greater than or equal to the projection amount of the first projection 32 of the first partition plate 30. Further, the second projection 42 of the second partition plate 40 may be shaped to overlap the first projection 32 of the first partition plate 30 as viewed in the extending direction of the passage 21. Alternatively, the second projection of the second partition plate 40 may be shaped to include a portion located at the outer circumferential side of the first projection 32 of the first partition plate 30. In addition, in the structure in which the second partition plate 40 includes the second projection 42, the distance L between the first partition plate 30 and the second partition plate 40 may be fixed.

The second partition plate 40 may be flat and extend in the cross-sectional direction of the passage 21. Alternatively, the second partition plate 40 may include a projection that projects toward a side opposite to the first partition plate 30.

The first projection 32 and the first annular flange 33 of the first partition plate 30 may include the sub-flow holes 36. Such a structure improves, for example, the freedom of forming positions of the sub-flow holes 36 and the freedom of the total of open areas of the sub-flow holes 36. This improves the freedom of the shape of the first partition plate 30 to improve the dispersability of an additive. Further, only the first annular flange 33 of the first partition plate 30 may include the sub-flow holes 36.

The shape of the passage 21 only needs to be tubular. The cross-sectional shape of the passage 21 is not limited to be circular and may be polygonal.

The first partition plate 30 only needs to be shaped so that the first central portion 31 is located at the upstream side of other portions of the first partition plate 30 in the passage 21. Thus, the first partition plate 30 does not have to include the first projection 32 and the first annular flange 33 and may include only a projection.

The first hole-formation region 38 may be located inward from the second hole-free region 48 as viewed in the extending direction of the passage 21.

The present examples and embodiments are to be considered as illustrative and not restrictive, and the invention is not to be limited to the details given herein, but may be modified within the scope and equivalence of the appended claims.

The invention claimed is:

1. An exhaust purification device comprising:
an adding valve that adds an additive to exhaust gas flowing through an exhaust passage;
a first partition plate including a flow hole through which the exhaust gas flows, wherein the first partition plate partitions the exhaust passage; and
a second partition plate including a flow hole through which the exhaust gas flows, wherein the second partition plate partitions the exhaust passage at a downstream side of the first partition plate and at an upstream side of a selective reduction catalyst, wherein
the first partition plate includes:
- a projection that projects toward an upstream side of the exhaust passage so that a central portion of the first partition plate is located at an upstream side of other portions of the first partition plate in the exhaust passage;
- a first hole-formation region that includes a main flow hole extending through the central portion and sub-flow holes surrounding the main flow hole, wherein the sub-flow holes each have a smaller open area than the main flow hole, and the first hole-formation region includes at least a portion of the projection; and
- a first hole-free region that surrounds the first hole-formation region, wherein the first hole-free region is free from flow holes, the second partition plate includes:
- a second hole-free region that includes a portion overlapping the main flow hole in an extending direction of the exhaust passage, wherein the second hole-free region is free from flow holes; and
- a second hole-formation region that surrounds the second hole-free region, wherein the second hole-formation region includes flow holes, and the adding valve includes an injector that injects the additive in a circumferential direction of the first hole-free region from a position opposing the first hole-free region in the extending direction and opposing the projection in a cross-sectional direction that is orthogonal to the extending direction.

2. The exhaust purification device according to claim 1, wherein
the first partition plate includes:
the projection; and
an annular flange that surrounds the projection,
wherein the annular flange includes an outer circumferential edge that is coupled to the exhaust passage, and the annular flange is shaped to extend in the cross-sectional direction.

3. The exhaust purification device according to claim 1, wherein
the first partition plate includes
the projection, and
an annular flange that surrounds the projection,
wherein the annular flange includes an outer circumferential edge that is coupled to the exhaust passage, and the annular flange is shaped to extend further toward the upstream side of the exhaust passage as the outer circumferential edge becomes closer.

4. The exhaust purification device according to claim 2, wherein the sub-flow holes extend through the projection.

5. The exhaust purification device according to claim 3, wherein the sub-flow holes extend through the projection.

6. The exhaust purification device according to claim 1, wherein the second partition plate includes a projection that projects toward the first partition plate so that a central portion of the second partition plate is located at an upstream side of other portions of the second partition plate in the exhaust passage.

7. The exhaust purification device according to claim 6, wherein the projection of the second partition plate is located inward from the projection of the first partition plate as viewed in the extending direction.

8. The exhaust purification device according to claim 6, wherein the projection of the second partition plate has a smaller projection amount than the projection of the first partition plate.

9. The exhaust purification device according to claim 1, wherein a region of the second hole-formation region located proximate to the second hole-free region has a higher open ratio than other regions of the second hole-formation region.

10. The exhaust purification device according to claim 1, wherein the injector injects the additive in a gravitational direction.

* * * * *